United States Patent
Forster

(10) Patent No.: US 10,447,621 B2
(45) Date of Patent: Oct. 15, 2019

(54) APP POWERED EXTENSIBILITY OF MESSAGES ON AN EXISTING MESSAGING SERVICE

(71) Applicant: Microsoft Technology Licensing, LLC, Redmond, WA (US)

(72) Inventor: Rowan Forster, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 261 days.

(21) Appl. No.: 14/482,801

(22) Filed: Sep. 10, 2014

(65) Prior Publication Data

US 2016/0072737 A1 Mar. 10, 2016

Related U.S. Application Data

(60) Provisional application No. 62/045,695, filed on Sep. 4, 2014.

(51) Int. Cl.
*H04L 12/58* (2006.01)

(52) U.S. Cl.
CPC .............. *H04L 51/04* (2013.01); *H04L 51/02* (2013.01); *H04L 51/36* (2013.01); *H04L 51/08* (2013.01); *H04L 51/16* (2013.01); *H04L 51/22* (2013.01)

(58) Field of Classification Search
CPC .......................................... H04L 51/00–51/36
See application file for complete search history.

(56) References Cited

U.S. PATENT DOCUMENTS

| 7,747,785 B2 | 6/2010 | Baker, III et al. |
| 8,103,734 B2 | 1/2012 | Galli et al. |

(Continued)

FOREIGN PATENT DOCUMENTS

| CN | 101075990 A | 11/2007 |
| CN | 102541569 A | 7/2012 |

(Continued)

OTHER PUBLICATIONS

Jeff Benjamin, iOS 7: The ultimate Messages app guide, Mar. 1, 2014, pp. 1-29 (Year: 2014).*

(Continued)

*Primary Examiner* — Clayton R Williams
(74) *Attorney, Agent, or Firm* — Mark K. Young; Mayer & Williams PC

(57) ABSTRACT

An instant messaging (IM) service interacts with IM clients operating on computing devices to implement an extensible platform with which individual composer applications ("apps") may interact to support a variety of different messaging user experiences for users of respective local and remote devices. Each IM client exposes an application programming interface for utilization by a local composer app to package content that the IM service then transparently transports to a remote device. An IM client on the remote device provides the package to an identified associated remote composer app that can unpack the content and use it to support the app's customized messaging experience for the remote user. The composer app also provides a preview of the experience supported by the packaged content that the clients on the respective local and remote devices may utilize in a messaging history and/or as a launching point to the composer app's user experience.

18 Claims, 16 Drawing Sheets

(56) References Cited

U.S. PATENT DOCUMENTS

| | | | | |
|---|---|---|---|---|
| 8,806,190 | B1* | 8/2014 | Munshi | H04L 63/0428 713/153 |
| 2004/0064696 | A1* | 4/2004 | Daigle | G06Q 10/06 713/168 |
| 2004/0179037 | A1* | 9/2004 | Blattner | G06T 13/40 715/751 |
| 2005/0064939 | A1* | 3/2005 | McSheffrey | A63F 13/12 463/42 |
| 2007/0244980 | A1* | 10/2007 | Baker, III | G06Q 10/107 709/207 |
| 2008/0091782 | A1* | 4/2008 | Jakobson | G06Q 10/10 709/206 |
| 2009/0319619 | A1 | 12/2009 | Affronti et al. | |
| 2012/0019610 | A1 | 1/2012 | Hornyak et al. | |
| 2012/0190388 | A1* | 7/2012 | Castleman | H04L 12/581 455/466 |
| 2012/0210253 | A1 | 8/2012 | Luna et al. | |
| 2014/0156843 | A1* | 6/2014 | Childs | H04L 65/40 709/225 |
| 2015/0013006 | A1* | 1/2015 | Shulman | H04L 63/1416 726/23 |

FOREIGN PATENT DOCUMENTS

| | | |
|---|---|---|
| CN | 102638444 A | 8/2012 |
| CN | 103546358 A | 1/2014 |
| EP | 2582120 A1 | 4/2013 |
| WO | 2011085248 A1 | 7/2011 |

OTHER PUBLICATIONS

Samer Kurdi, "Eleven must have free add-ons for Skype", 2011, Freewaregenius.com, pp. 1-9 (Year: 2011).*

Adam Ostrow, "Skype Toolbox: 50+ Enhancements for Skype", Aug. 21, 2007, Mashable.com, pp. 1-11 (Year: 2007).*

"Send Contacts from iPhone to Another iPhone", OSXDaily, Feb. 1, 2012 (Year: 2012).*

"Welcome to Kik!", Published on: Feb. 7, 2014, Retrieved from: http://kik.com/legal/ Retrieved on: Jun. 30, 2014 (21 pages total).

Pachter, et al., "PRISM . . . Progress Report for Internet and Social Media", Published on: Apr. 29, 2013, Available at: https://equities.wedbush.com/Reports/%5CPRISM%5CPRISM04292013.pdf (10 pages total).

"Nimble Messaging Apps Could Challenge Facebook's Mobile Success", Published on: May 3, 2013, Retrieved from: http://www.forbes.com/sites/parmyolson/2013/05/01/nimble-messaging-apps-could-challenge-facebooks-mobile-success/ Retrieved on: Jun. 27, 2014 (5 pages total).

Roberg, Miguel, "How to Maximize Your WeChat Marketing Campaigns", Published on: May 30, 2014, Retrieved from: http://maximizesocialbusiness.com/maximize-wechat-marketing-campaigns-13888/ Retrieved on: Jun. 30, 2014 (14 pages total).

Grandich, Dario, "Developers . . . Integrate Vzaar Video Hosting with Your App", Retrieved from: http://vzaar.com/for/developers Retrieved on: Jun. 30, 2014 (6 pages total).

Lomas, Natasha, "Line Expands Its Mobile Messaging Empire on Android With Third-Party App Downloads Incentivised by Line Coin", Published on: Jun. 21, 2013, Retrieved from: http://techcrunch.com/2013/06/21/line-free-coin/ Retrieved on: Jun. 30, 2014 (4 pages total).

"International Search Report & Written Opinion Issued in PCT Patent Application No. PCT/US2015/048006", dated Nov. 25, 2015, (12 Pages total).

"Second Written Opinion Issued in PCT Application No. PCT/US2015/048006", dated Aug. 12, 2016, (6 Pages total).

"International Preliminary Report on Patentability Issued in PCT Application No. PCT/US2015/048006", dated Dec. 14, 2016, 7 Pages.

"First Office Action Issued in Chinese Patent Application No. 201580047590.6", dated Jul. 9, 2019, 24 Pages.

* cited by examiner

APP POWERED EXTENSIBILITY OF MESSAGES ON AN EXISTING MESSAGING SERVICE

STATEMENT OF RELATED APPLICATION

This application claims benefit and priority to U.S. Provisional Application Ser. No. 62/045,695 filed Sep. 4, 2014, entitled "APP POWERED EXTENSIBILITY OF MESSAGES ON AN EXISTING MESSAGING SERVICE" which is incorporated herein by reference in its entirety.

BACKGROUND

New messaging applications are introduced to the marketplace frequently and often provide a single unique feature or differentiator. Some of these become successful long term while many others are brief fads that are quickly dropped in favor of something else. Some of the main drawbacks for users in adopting new messaging applications include needing to sign up for a new messaging network and then getting their friends and contacts to adopt it too.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An instant messaging (IM) service interacts with IM clients operating on computing devices to implement an extensible platform with which individual composer applications ("apps") may interact to support a variety of different messaging user experiences for users of respective local and remote devices. Each IM client exposes an application programming interface (API) that can be utilized by a local composer app to package content that the IM service then transparently transports to a remote device. An IM client on the remote device provides the package to an identified associated remote composer app that can unpack the content and use it to support the app's customized messaging experience for the remote user. The composer app also provides a preview of the experience supported by the packaged content that the clients on the respective local and remote devices may utilize, for example, in a messaging history and/or as a launching point to the composer app's user experience.

Advantageously, the IM service implements an extensible messaging platform onto which composer apps can be built and operate that readily lets users participate in new messaging features and experiences. The users can simply log on to the IM service, for example using their existing credentials and then utilize as many composer apps as they wish. It becomes easy for users to try out something new without having to sign up for a brand new service for each different app and then persuade their messaging contacts (e.g., friends, family, colleagues, etc.) to adopt the new service too. The present IM service leverages its underlying message transport capabilities and existing user population to implement a lightweight messaging app ecosystem where developers can focus on compelling features and user experiences without having to deal with transport mechanics, user authentication, app deployment, and other issues. The ecosystem can accordingly streamline app development, accelerate time to market, and improve overall app adoption. In addition, broader and richer messaging features become available to users who can pick and choose among the various experiences to tailor the messaging features to their particular needs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals indicate like elements in the drawings. Elements are not drawn to scale unless otherwise indicated. It is emphasized that the particular UIs displayed in the drawings can vary from what is shown according to the needs of a particular implementation.

DETAILED DESCRIPTION

Figure 1:
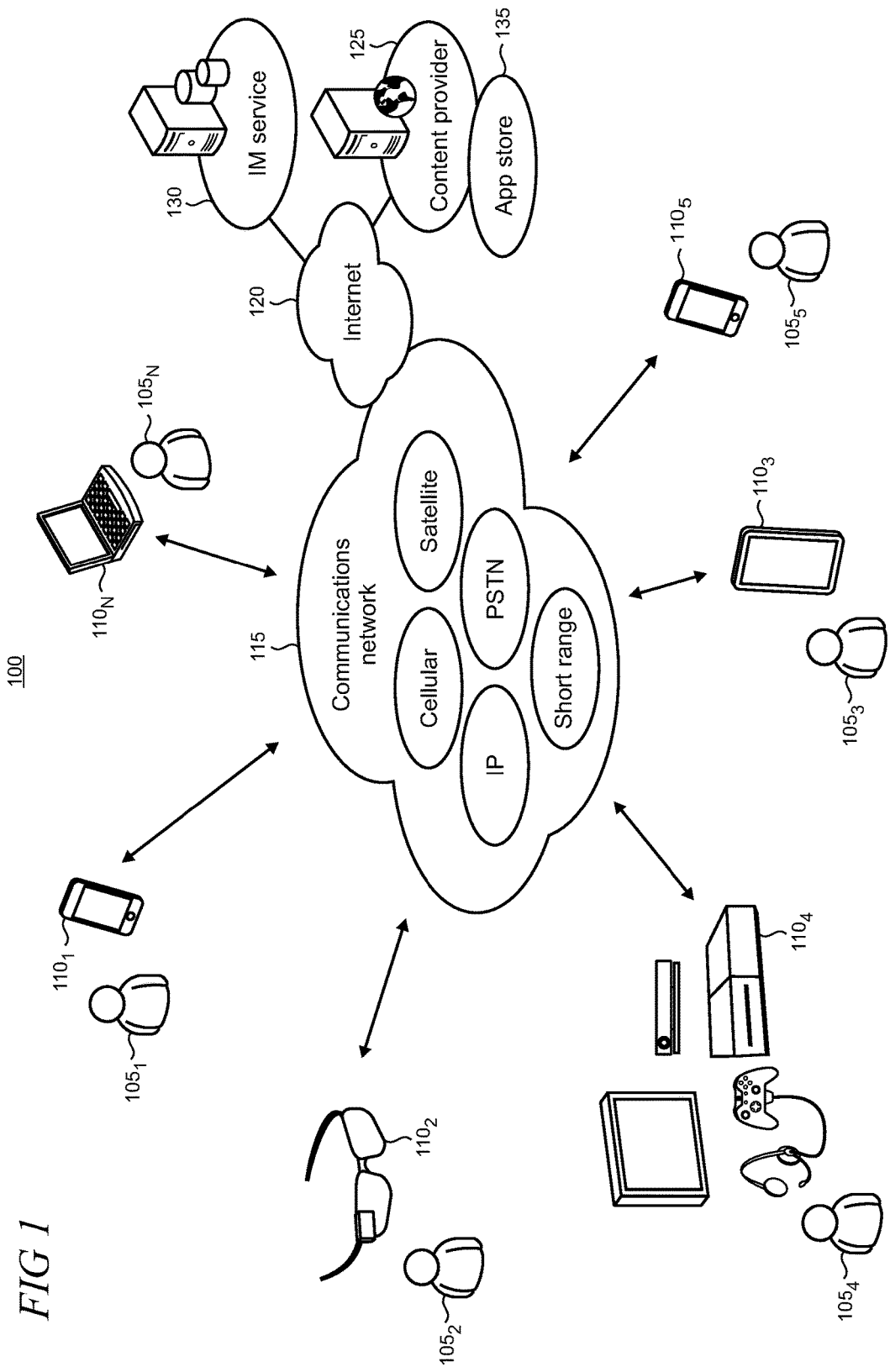
FIG. 1 shows an illustrative environment in which devices having communications capabilities interact over a network.

FIG. 1 shows an illustrative communications environment 100 in which various users 105 employ respective devices 110 that communicate over a communications network 115. The devices 110 provide various communication capabilities, such as voice and video calling and messaging, and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting), use applications and access services that employ data, browse the World Wide Web, and the like. However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access the communications network 115 in order to implement various user experiences. The communications network can include any of a variety of network types and network infrastructure in various combinations or sub-combinations including cellular networks, satellite networks, IP (Internet Protocol) networks such as Wi-Fi and Ethernet networks, a public switched telephone network (PSTN), and/or short range networks such as Bluetooth networks. The network infrastructure can be supported, for example, by mobile operators, enterprises, Internet service providers (ISPs), telephone service providers, data service providers, and the like. The communications network 115 typically includes interfaces that support a connection to the Internet 120 so that the mobile devices 110 can access content provided by one or more content providers 125 and access an IM service 130. In this illustrative example, the content provider 125 supports an app store 135.

Figure 2:
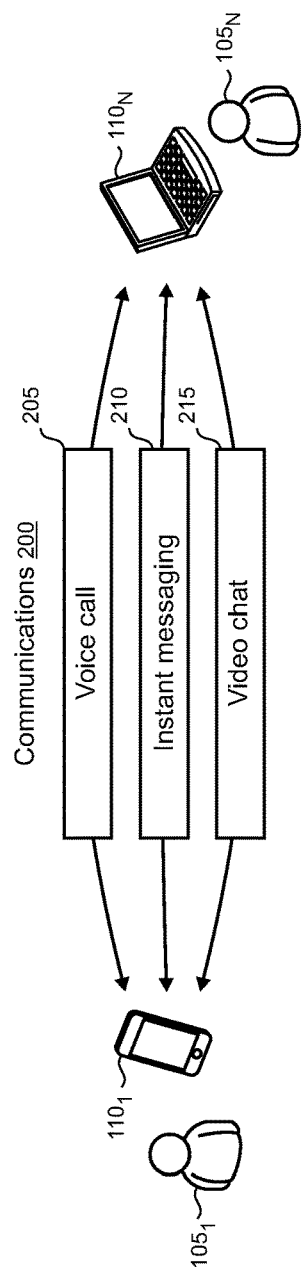
FIG. 2 shows illustrative communications between device users.

The devices 110 and communications network 115 may be configured to enable device-to-device communication. As shown in FIG. 2, such device-to-device communications 200 can include, for example, voice calls 205, instant messaging (IM) 210, and video chats 215. While communications 200 are depicted between two devices 110, it is noted that multi-party communications (e.g., teleconferencing and group messaging) may also be implemented. Support for device-to-device communication 200 may be provided using one or more applications that run on a device 110.

Figure 3:
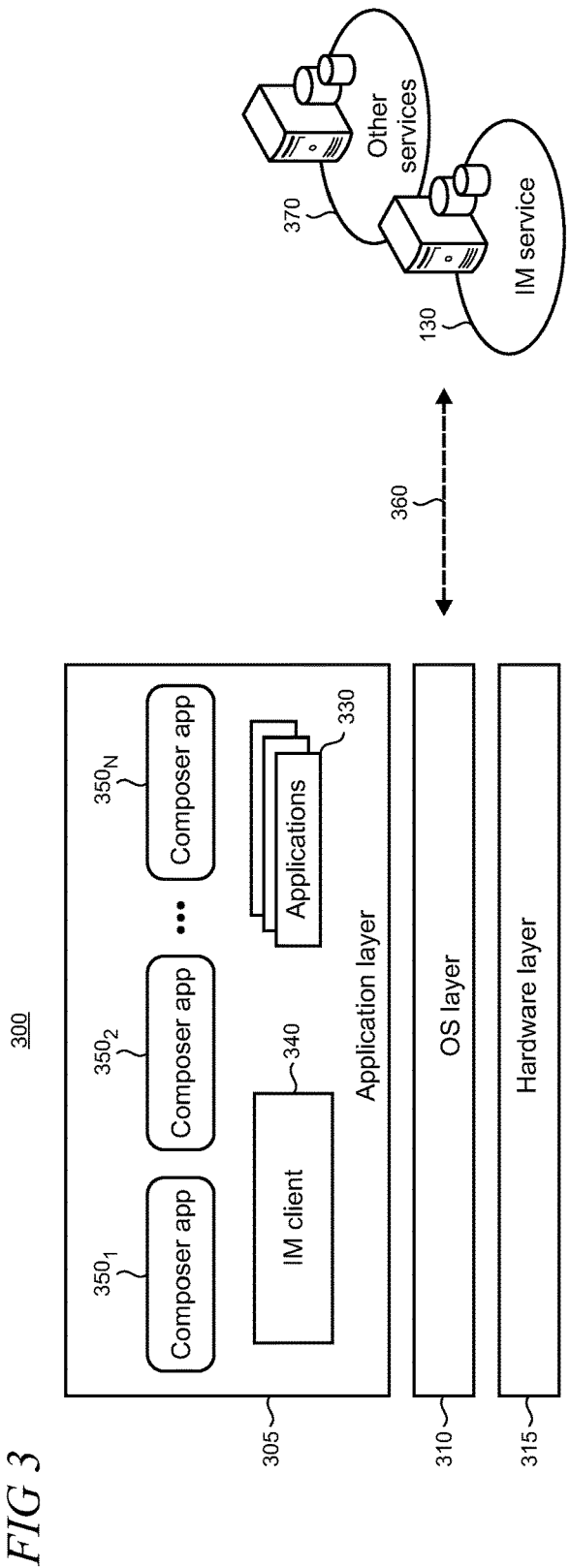
FIG. 3 shows an illustrative layered architecture that includes an application layer, operating system (OS) layer, and hardware layer.

For example, FIG. 3 shows an illustrative layered architecture 300 that may be instantiated on a given device 110 that supports various applications. The architecture 300 is typically implemented in software, although combinations of software, firmware, and/or hardware may also be utilized in some cases. The architecture 300 is arranged in layers and includes an application layer 305, an OS (operating system) layer 310, and a hardware layer 315. The hardware layer 315 provides an abstraction of hardware used by the device 110 (e.g., input and output devices, networking and radio hardware, etc.) to the layers above it.

The application layer 305 in this illustrative example supports various applications (apps) 330 (e.g., web browser, map app, email app, etc.), as well as an IM client 340. One commercially available example of the IM client 340 is Skype™ distributed by Microsoft Corporation, however it is emphasized that the IM client is not limited to this one example. The apps 330 are often implemented using locally executing code. However in some cases, these apps may rely on services and/or remote code execution provided by remote servers or other computing platforms such as those supported by the IM service 130 or other cloud-based resources. While the apps 330 are shown here as components that are instantiated in the application layer 305, it may be appreciated that the functionality provided by a given app may be implemented, in whole or part, using components that are supported in either the OS or hardware layers.

The IM client 340 is typically configured to interact with the IM service 130, as indicated by line 360 when providing IM and other services such as voice calling and video chat. In addition, the IM client 340 may utilize and/or interact with the other OS components (and/or other components that are instantiated in the other layers of the architecture 300) and/or other remote services 370 as may be needed to implement the various features and functions described herein. While the IM client 340 is shown in this illustrative example as being instantiated in the application layer 305, it will be appreciated that the functionality provided by the IM client may be implemented, in whole or part, using components that are supported in either the OS and/or hardware layers.

Figure 4:
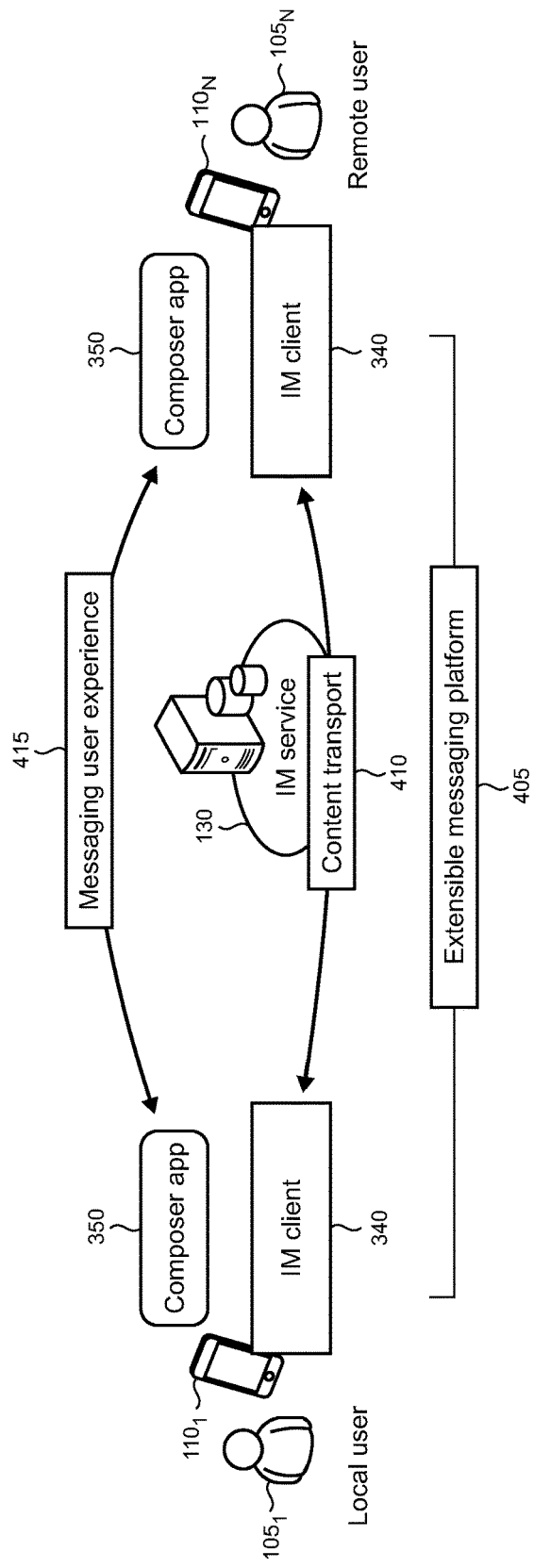
FIG. 4 shows an illustrative arrangement in which an instant messaging (IM) service and IM clients operating on local and remote devices provide an extensible messaging platform to a composer app that is instantiated on the devices.

The application layer 305 also supports a variety of different composer apps 350. The composer apps 350 are arranged to interact with the IM client 340 to provide different messaging user experiences. As shown in FIG. 4, the service 130 and IM clients 340 function as an extensible messaging platform 405 that supplies the underlying content transport 410 for a messaging user experience 415 provided by a composer app 350 that is instantiated on each of the local and remote devices 110.

Figure 5:
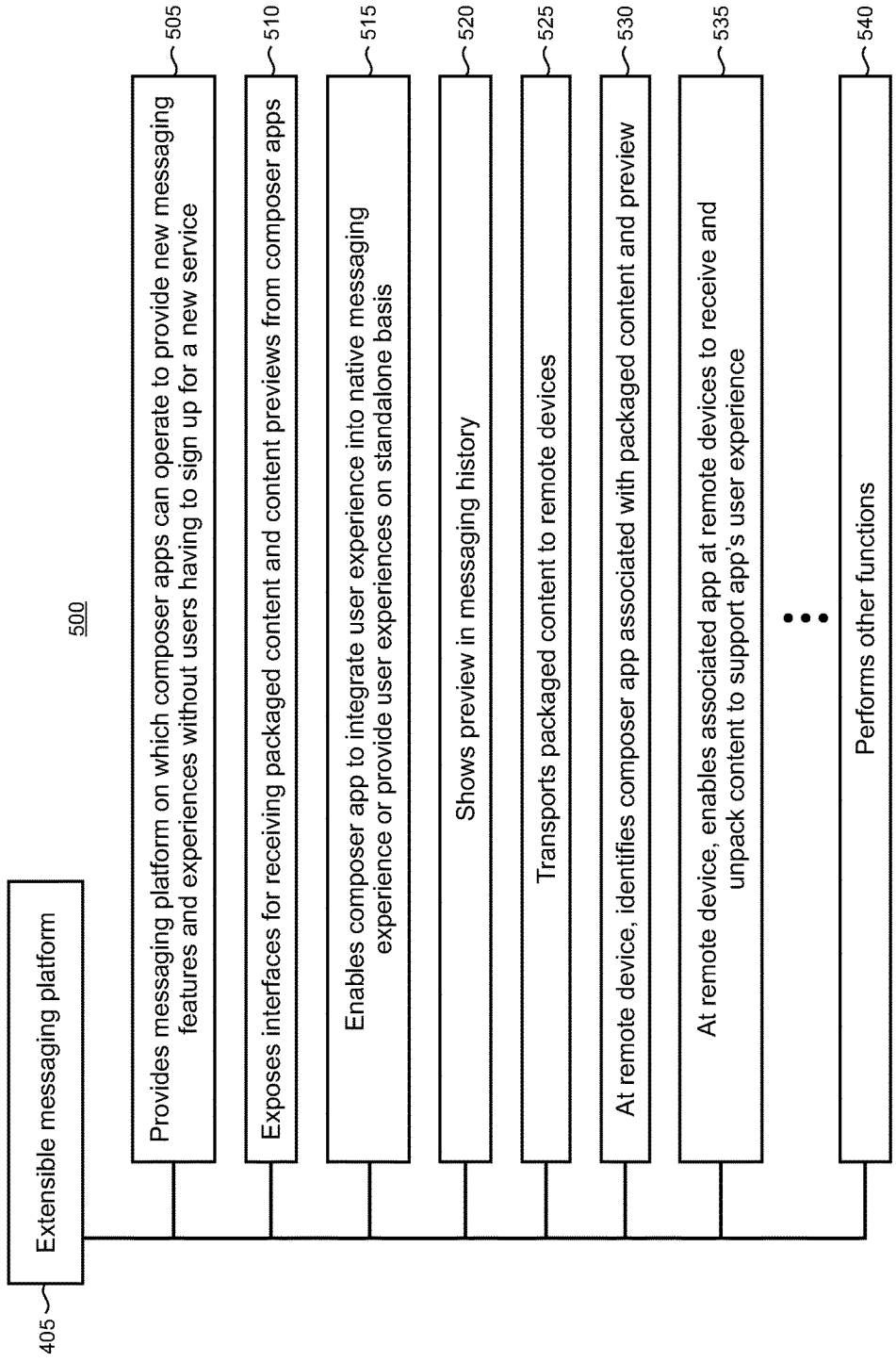
FIG. 5 shows an illustrative taxonomy of features and functions that may be supported by a VoIP (Voice over Internet Protocol) and IM client.

FIG. 5 shows an illustrative taxonomy of functions 500 that may be supported by the extensible messaging platform 405 in typical implementations. Each of the functions 500 are discussed in more detail in the text accompanying FIGS. 6-12 below.

As shown in FIG. 5, the functions 500 illustratively include providing a content transport platform on which composer apps can operate to provide messaging features and experiences (as indicated by reference numeral 505). As noted above, the platform enables such features and experiences to be implemented without users having to sign up for a new service. The functions 500 may also include exposing interfaces at the local device to the composer apps to package content for transport and provide content previews (510) and enabling the composer app to integrate its user experience into a native messaging experience supported by the IM service and clients (in which the IM service and clients may be collectively referred to as an IM application) or provide the user experience on a standalone basis (515). For example, in some implementations, a given composer app can be launched from within a messaging experience as a way to provide an additional messaging feature or enhancement. In other implementations, a composer app may be arranged to provide features, functions, and user experiences in a more focused and/or differentiated offering. Here, the composer app can be launched on a standalone basis outside the IM application while the extensible messaging platform supports transparent content transport.

The functions 500 further include showing the content preview in a messaging history at the local and remote devices in some cases (520); transporting the packaged content and preview (525); at the remote device, identifying the composer app that is associated with the packaged content and preview (530); at the remote device, enabling the associated composer app to receive and unpack the content to support the app's particular user experience (535); and providing and supporting other features and functionalities (540). The list of functions 500 is illustrative and not intended to be exhaustive and other functions may be supported by the extensible messaging platform to meet the needs of a particular implementation.

Figure 6:
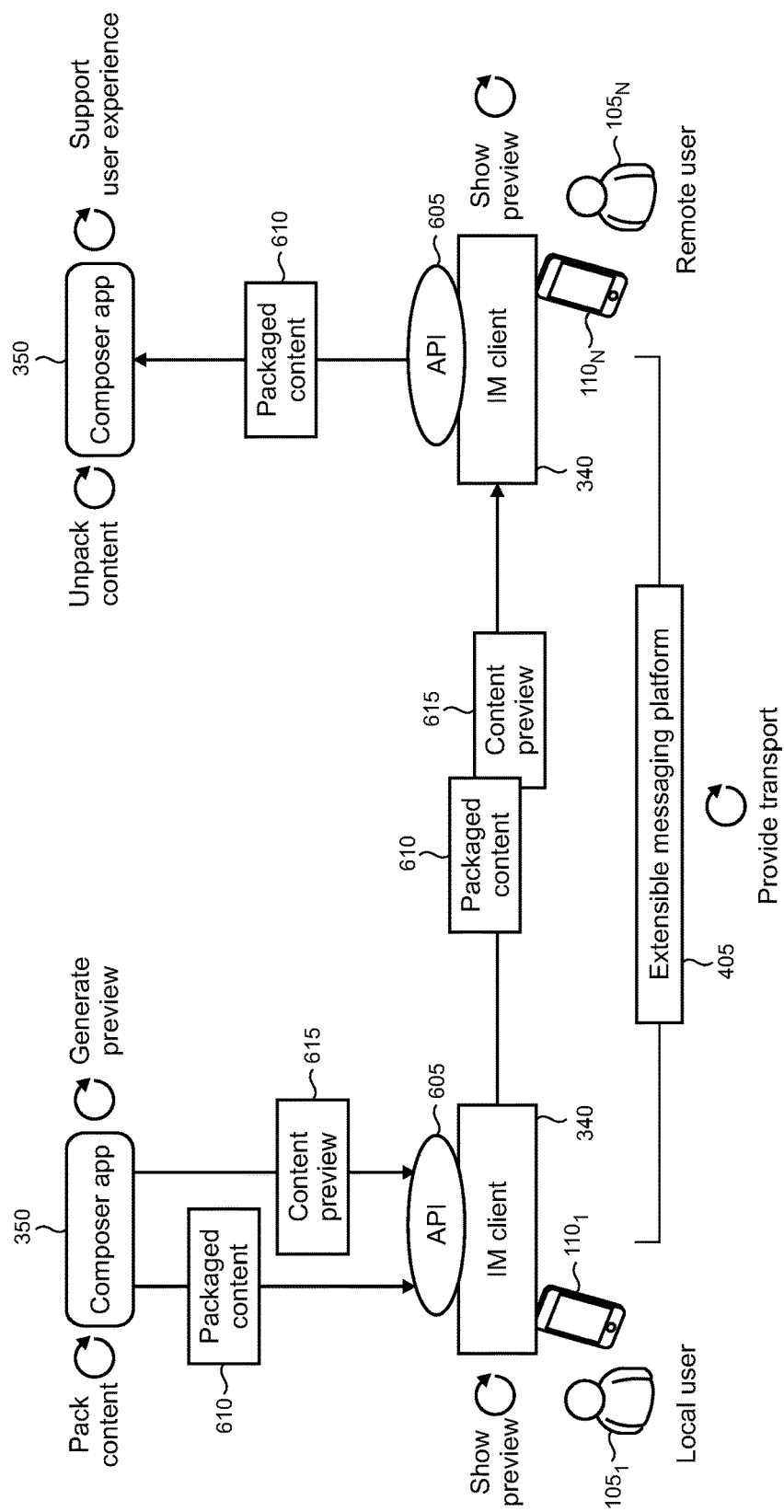
FIG. 6 shows an illustrative arrangement in which a composer app interacts with an application programming interface (API) to pack content into a file and provide a content preview.

FIG. 6 is a diagram that shows illustrative interactions between a composer app 350 and the extensible messaging platform 405. As shown, each IM client 340 exposes an instance of an API 605 to the composer app 350 on the respective local and remote devices 110. At the local device, the composer app 350 packs content into a file that can be transported by the extensible messaging platform to the remote device. The file type for packaged content is platform specific in typical implementations and the composer app will generally need to conform to certain specifications when packaging content for transport and interfacing with the API 605. The particular specifications and API requirements utilized can vary by implementation.

The packaged content 610 can include a variety of data, information, attributes, parameters, etc. as the composer app may need to pass to its corresponding app on the remote device in order to support its user experience. In alternative implementations, composer app content can utilize conventional or common file types. For example, if the composer app provides an experience in which the local user can embed special effects in a video clip, then the completed video can be packaged in a container format such as MOV, MP4, AVI, WMV, MPG, etc.

In addition to providing packaged content to the IM client 340 through the API 605, the composer app will typically generate a preview 615 of the packaged content as part of its interactions with the extensible messaging platform 405. In typical implementations, a variety of preview types can be supported. For example, the preview can comprise static images, graphics, animations, sounds, etc. using common file containers such as JPG, GIF, WAV, and the like. The IM clients 340 may utilize the preview, for example, as part of a message history in cases where the composer app's user experience is integrated with messaging.

The extensible messaging platform 405 can transport the packaged content 610 and preview 615 to the remote device 110. The remote IM client 340 can use the transported content preview 615 in some cases. For example, the preview can be used as part of a control that is exposed to the user at the remote device as a launching point to the composer app's user experience.

At the remote device, the IM client 340 identifies the particular composer app that is associated with the transported content and hands it off to the app using the remote API 605. The remote composer app 350 unpacks the content and can use it in support of the app's user experience.

FIGS. 7-12 show screen captures of illustrative user interfaces (UIs) displayed on a device 110 at various points during a user's interaction with the extensible messaging platform and a composer app. It is noted that all the UIs shown in the drawings are intended to be illustrative and that the presentation of information, exposed features and controls, and the overall look and feel of the UI can vary from what is shown by implementation. In addition, in the description that follows, user interaction with the UIs is discussed in the context of a device that exposes a touch screen interface. However, it is noted that other types of inputs can also be utilized according to the features supported on a given device such as physical or virtual button presses, gesture inputs into a gesture recognition device/software, voice commands, natural language inputs, etc. The particular user action that may be utilized for a given purpose can vary by implementation and device.

Figure 7:
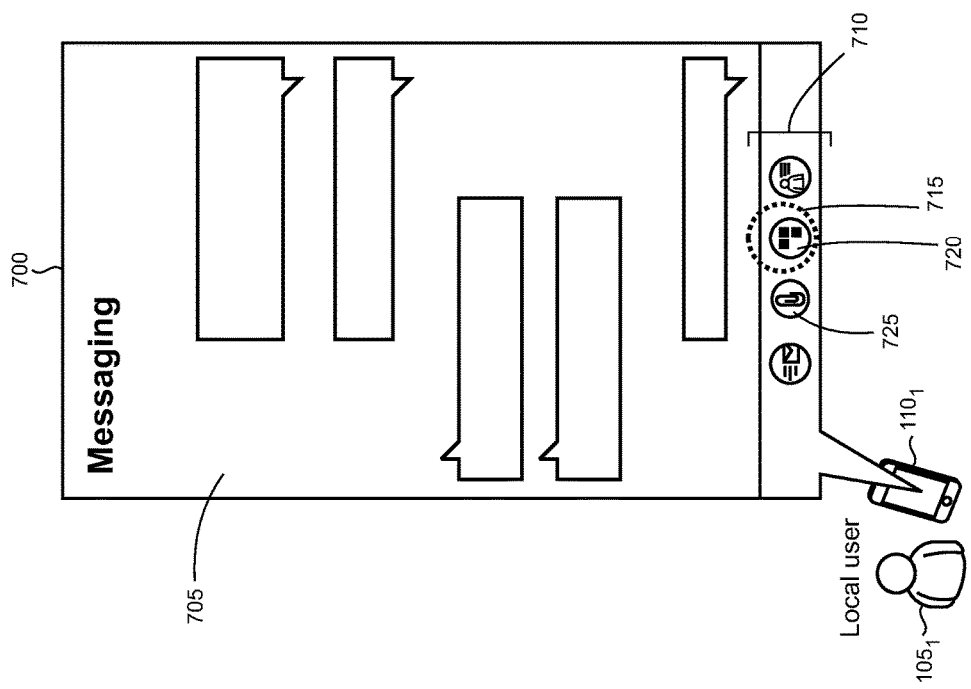
Figure 10:
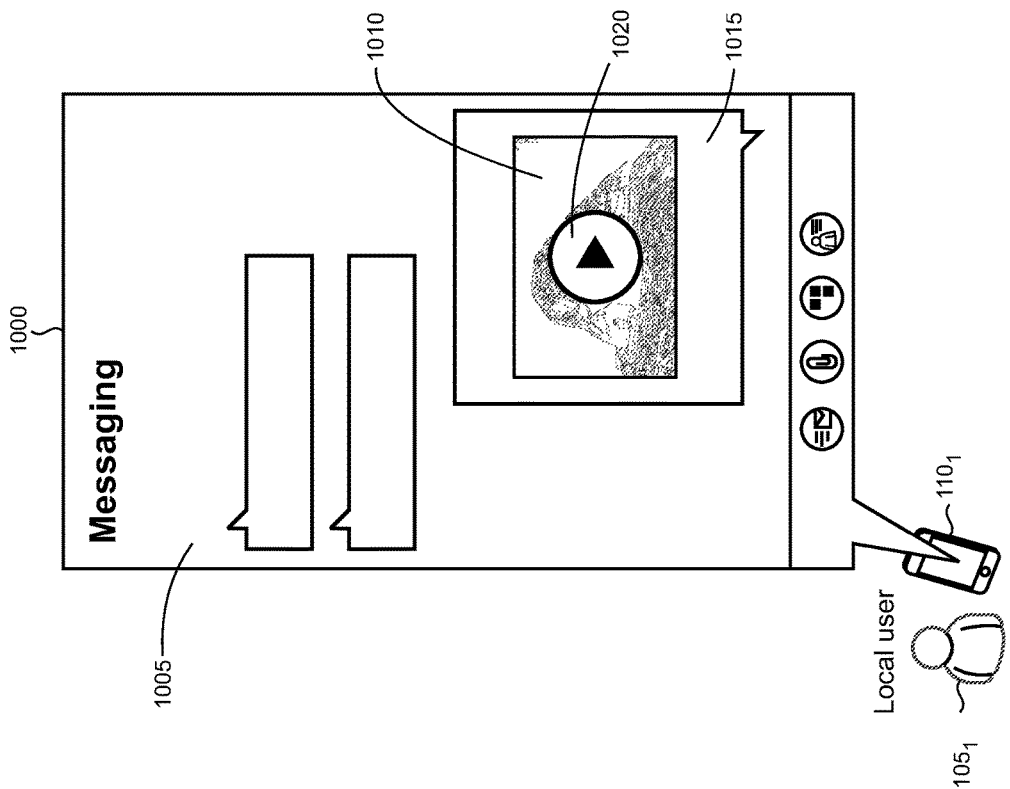

UI 700 in FIG. 7 may be exposed by the IM client 340 (FIG. 3) running on a local device 110 such as a smartphone to display a chat card 705 associated with an IM conversation between the local and remote users. In this illustrative example, the chat card 705 shows incoming messages from the remote user on the left side and outgoing messages generated by the local user on the right side (in which the message content is not shown for sake of clarity in exposition). In this illustrative example, the messaging UI includes controls 710 that are exposed to the user 105 to invoke various functions and the user employs a touch 715 on a composer app button 720 to launch the UI 800 in FIG. 8 that enables a particular composer app to be picked for use. Alternatively in some implementations, the user 105 can employ the attachment button 725 to expose a UI (not shown) that can show composer apps, typically along with other conventional attachment tools or utilities, that may be utilized to select or create/modify content that can be sent to a remote device as an attachment to a message.

Figure 8:
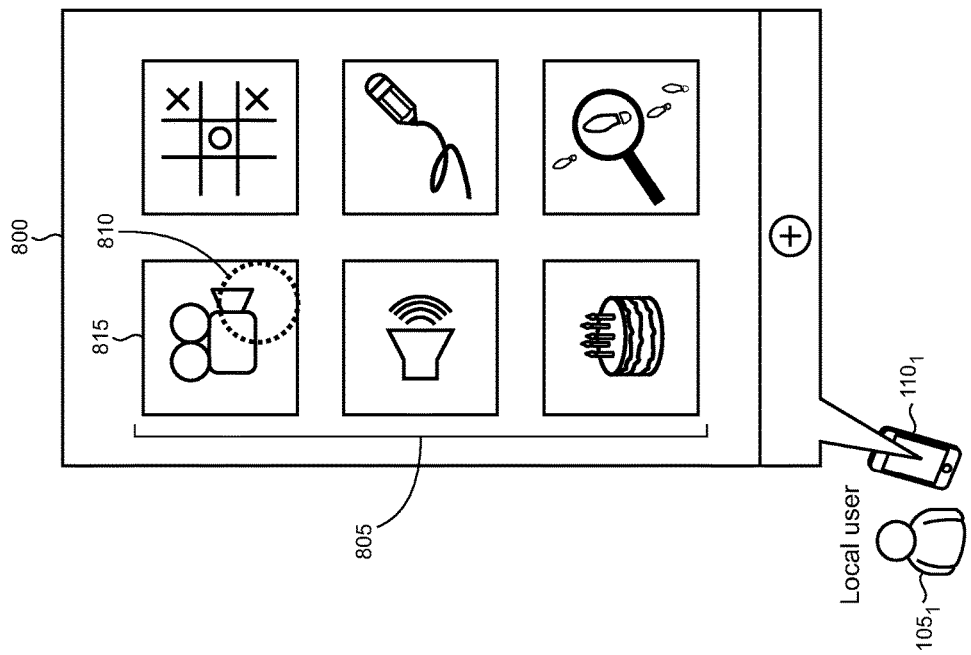
FIGS. 7-12 show screen captures of illustrative user interfaces (UIs) displayed on a device to facilitate the present app powered extensibility.

The UI 800 in FIG. 8 exposes a variety of composer apps 805 represented as tiles that may be invoked by the user 105 to launch different messaging user experiences. In some implementations, the UI 800 is user scrollable (e.g., horizontally or vertically) to show other composer apps that may be installed, and/or the user may employ other controls such as buttons to show other installed apps. In this particular illustrative example, the user has employed a touch 810 on a composer app 815 that supports video features. The particular composer apps installed on a given device can vary widely in terms of the features and user experience that each supports. For example, and not by way of limitation, different composer apps can support features and experiences dealing with messaging with individuals and/or groups, sports and gaming (including multiplayer and/or turn-by-turn games), voice and video calling, music, drawing and creative expression (e.g., doodling, cartooning, painting, etc.), collaboration, and the like. Virtually any composer app that relies on data and information exchange between local and remotes devices can utilize the extensible messaging platform when implementing its particular user experience.

Figure 9:
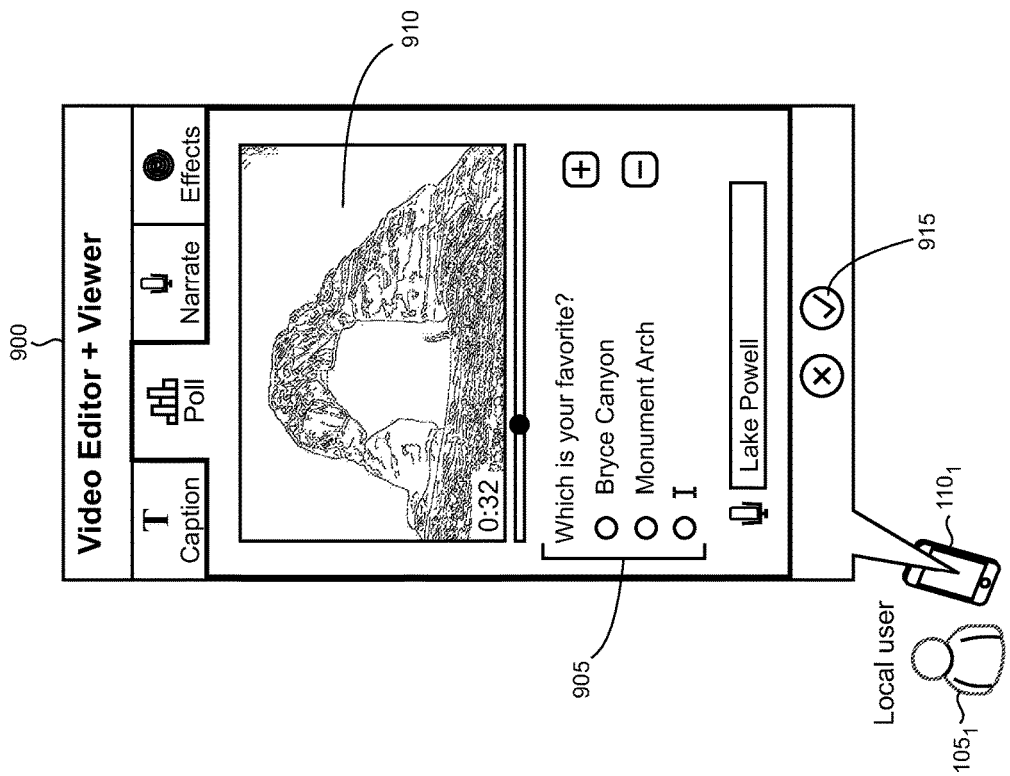
Figure 12:
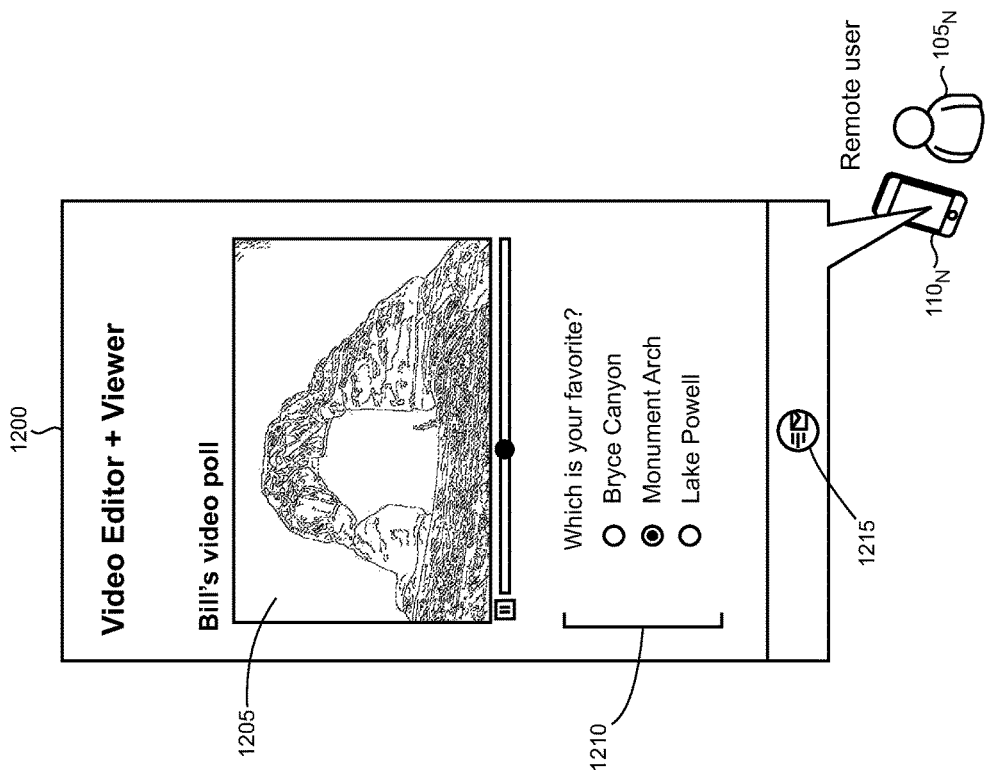

Continuing the description of FIG. 8, in this particular example the user's touch on the tile launches the video composer app 815 which renders its own UI to support interaction with the user on the local device 110. The illustrative UI 900 in FIG. 9 shows how the video composer app supports several features. Here, the user 105 has selected a poll feature 905 that lets the local user compose a poll 905 regarding an associated video clip 910 that can be sent out to one or more remote users (Not shown in FIG. 9 are the UIs that the user would employ to select and/or edit the particular video clip that is available to the local device—e.g., locally stored or accessed from a remote store—that is used for the poll). Accordingly, in this illustrative example, the video composer app 815 generates content which includes data associated with the user's poll and the associated video clip which the app packages for transport by the extensible messaging platform 405 using the API 605 (FIG. 6).

The video composer app 815 typically also generates and provides a preview of the packaged content to the messaging platform. Once the user 105 is finished with the composer app and employs the checkmark button 915, the messaging UI is brought up again on the local device 110 as shown in the UI 1000 in FIG. 10. The local IM client uses the preview in the messaging history displayed in the chat card 1005 by showing a thumbnail 1010 in the local user's outgoing message 1015. The thumbnail includes a play icon 1020 to indicate that the message includes playable content. The local user can employ a touch gesture on the thumbnail to re-launch the video composer app to review the content (i.e., launch the same experience that is being sent to the remote user).

Figure 11:
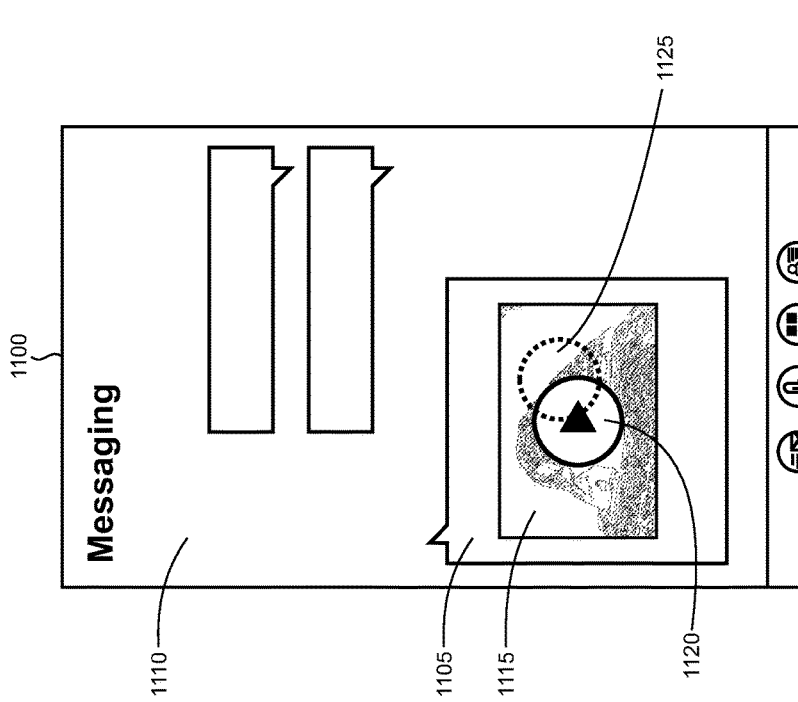

FIG. 11 shows a UI 1100 displayed by the remote IM client at the remote device. The message 1105 from the local user is shown in the remote user's messaging history on the left side of the chat card 1110 and includes the preview 1115 and a play icon 1120. When the remote user employs a touch 1125 on the preview, the remote IM client identifies the associated video composer app which launches on the remote device. The video composer app unpacks the content and uses it to generate the experience for the remote user, here including the video clip 1205 and the poll 1210 as shown in the UI 1200 in FIG. 12. When the remote user responds to the poll, he or she can send it back to the local user using the send button 1215.

Each of the devices used by the local and one or more remote parties in a given user experience in the illustrative examples discussed above have both an IM client and the relevant composer app installed and executing. In other exemplary scenarios, one or more of the parties wanting to participate in the experience may not have the needed component and apps instantiated on their particular devices.

Figure 13:
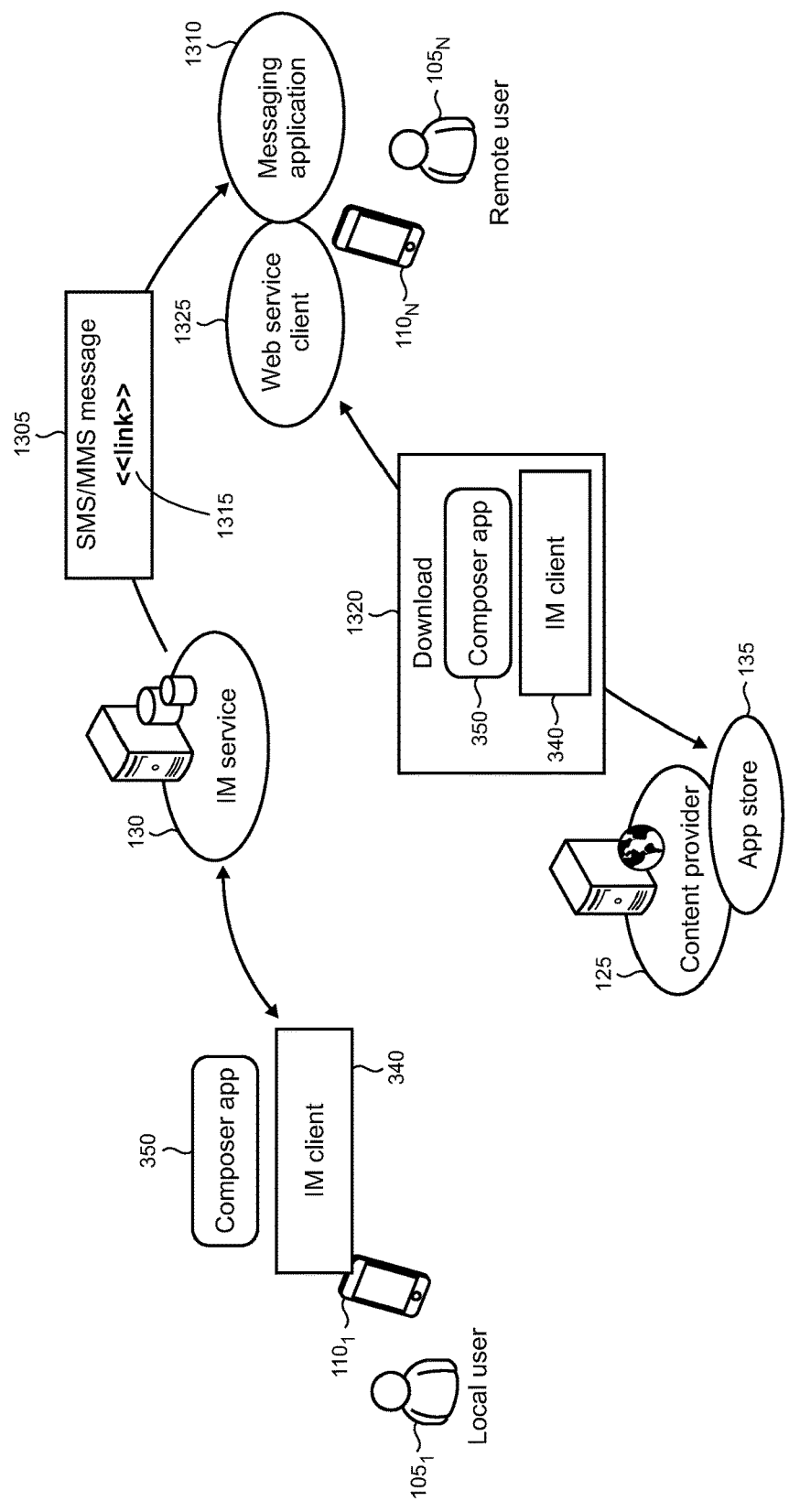
FIG. 13 shows an illustrative arrangement in which a message is utilized to provide a link to enable downloading of components at a remote device.

A composer app's experience may still be implemented in such cases by leveraging capabilities provided by the IM service 130 as shown in FIG. 13. Here, when the IM service 130 detects that the remote user is an unknown user (e.g., is not already a user of the IM service), or the remote device is missing a needed component or app to render the experience, the IM service 130 may send a text message 1305 over a protocol such as SMS (Short Message Service) or MMS (Multimedia Messaging Service) to a messaging application 1310 on the remote device 110. The message 1305 can include a link 1315 to the app store 135 exposed by the content provider 125. By following the link 1315, the remote user can invoke a download 1320 to a web service client 1325 such as a browser or other application on the remote device. The download 1320 can include the IM client 340 and/or the relevant composer app 350 which can be loaded and executed on the remote device as needed to support the composer app's user experience. In alternative implementations, the IM service 130 and/or the content provider 125 can host the composer app's user experience as a cloud-based web app that runs on the remote device's browser or other appropriate application.

Figure 14:
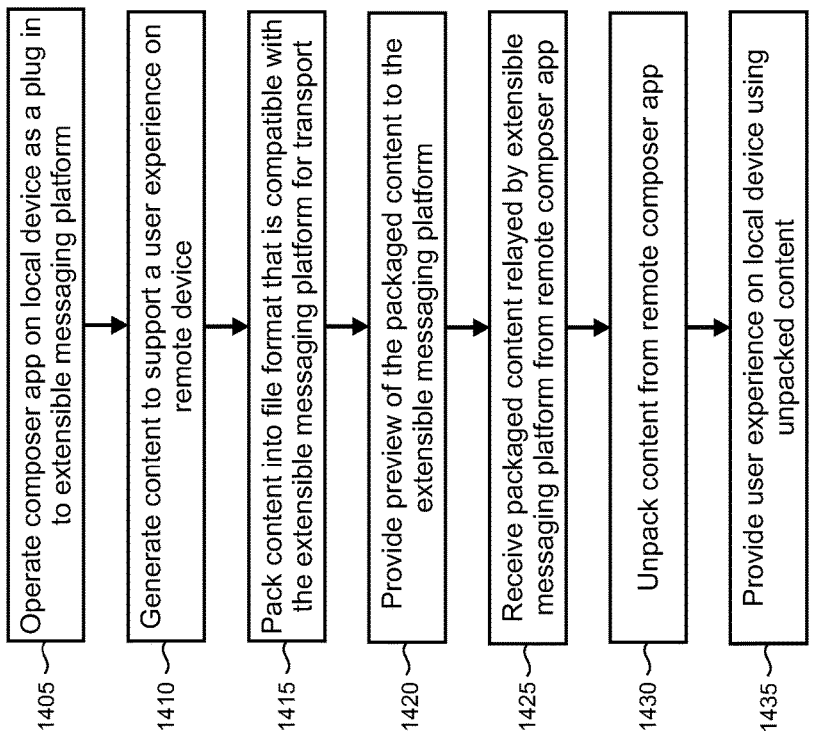
FIGS. 14, 15, and 16 show illustrative methods that may be performed when implementing the present app powered extensibility.

FIG. 14 shows a flowchart of an illustrative method 1400 for operating a composer application. Unless specifically stated, the methods or steps shown in the flowcharts below and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1405, a composer app 350 on a local device 110 is operated as a plug-in to the extensible messaging platform 405. The composer app 350 generates content to a user experience on the remote device in step 1410. In step 1415, the composer app 350 packs the content into a file having a format that is compatible with the extensible messaging platform 405. In step 1420, the composer app 350 provides a preview of the packaged content to the extensible messaging platform.

In step 1425, the composer app 350 receives packaged content produced by a remote composer app on the remote device that is relayed by the extensible messaging platform 405. In step 1430, the composer app 350 unpacks the content and provides a user experience on the local device in step 1435.

Figure 15:
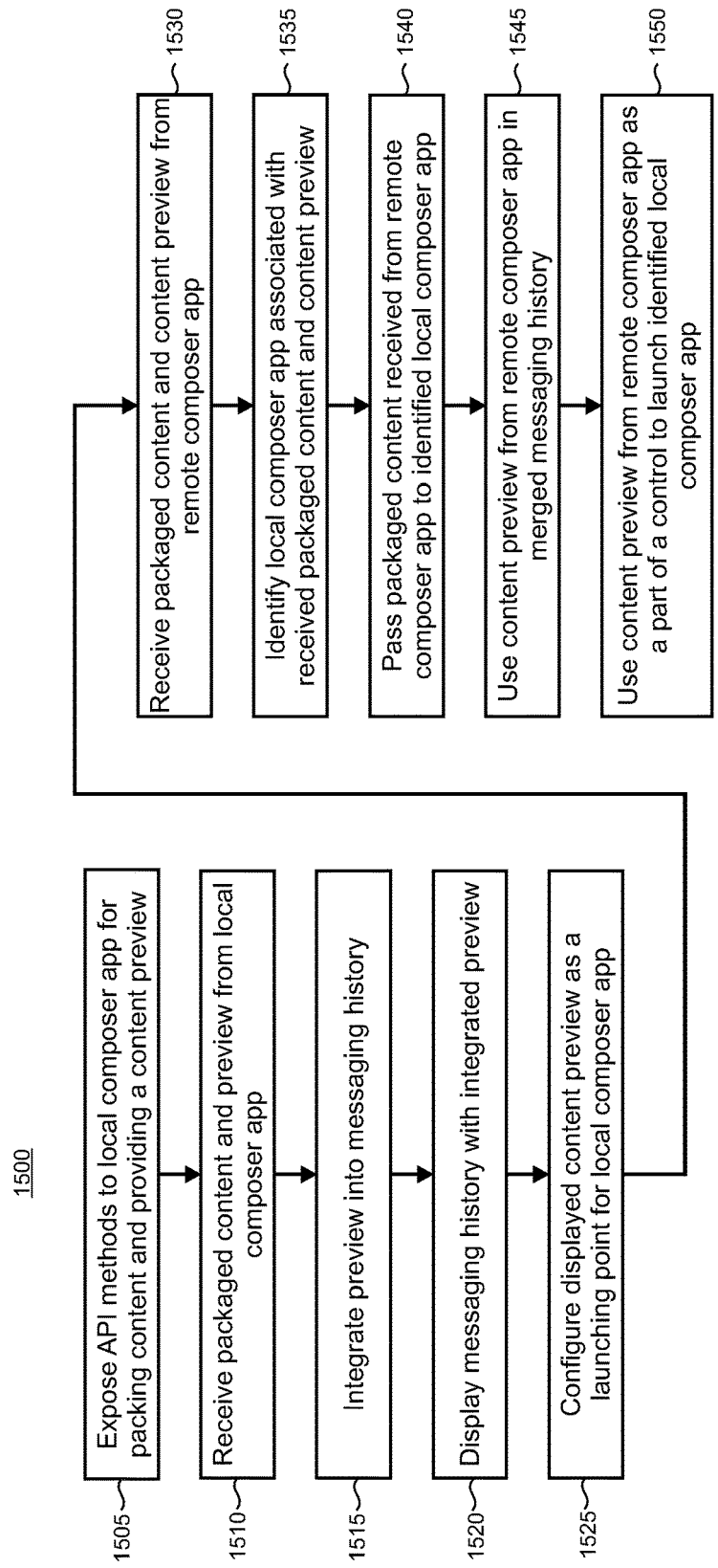

FIG. 15 shows a flowchart of an illustrative method 1500 for supporting one or more composer applications executing on a device. In step 1505, an IM client 340 on a local device exposes methods through the API 605 to a local composer app 350. The API methods enable the composer app to package content and provide content previews that are compatible with a file format supported by the extensible messaging platform 405. In step 1510, the IM client 340 receives packaged content and the content preview from the local composer app 350.

In step 1515, the IM client 340 integrates the preview into a messaging history and displays the messaging history on the local device in step 1520. In step 1525, the IM client 340 configures the content preview in the messaging history to operate as a launching point for the local composer app 350.

In step 1530, the IM client 340 receives packaged content and a content preview from a remote composer app that is transported by the IM service 130. The IM client 340 identifies a local composer app 350 that is associated with the received content and preview in step 1535 and passes the packaged content to the identified local composer app in step 1540. In step 1545, the IM client 340 uses the content preview received from the remote composer app in a merged messaging history. In step 1550, the IM client 340 uses the content preview as part of a user-selectable control for launching the identified local composer app.

Figure 16:
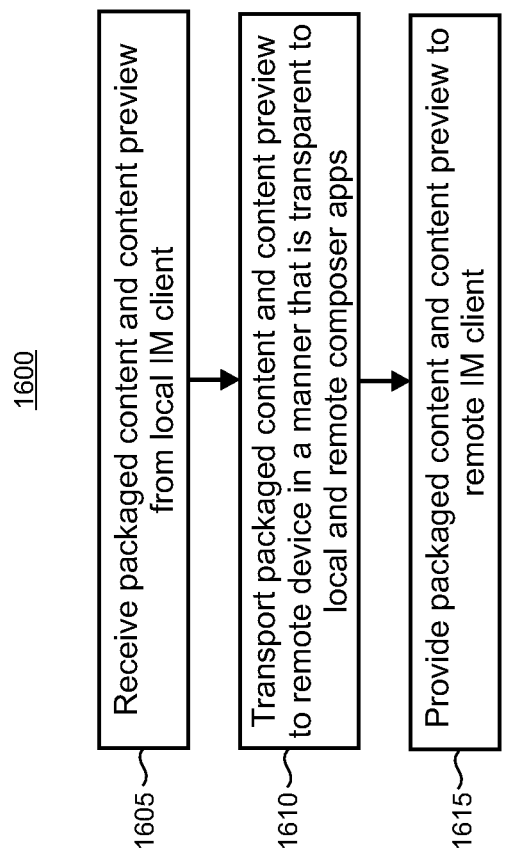

FIG. 16 shows a flowchart of an illustrative method 1600 for operating an extensible messaging platform. In step 1605, the IM service 130 receives content packaged by a composer app 350 and a content preview from a local IM client 340. In step 1610, the IM service 130 transports the packaged content and content preview to a remote device in a manner that is transparent to the local and remote composer apps 350. In step 1615, the IM service 130 provides the packaged content and content preview to the remote IM client at the remote device.

Figure 17:
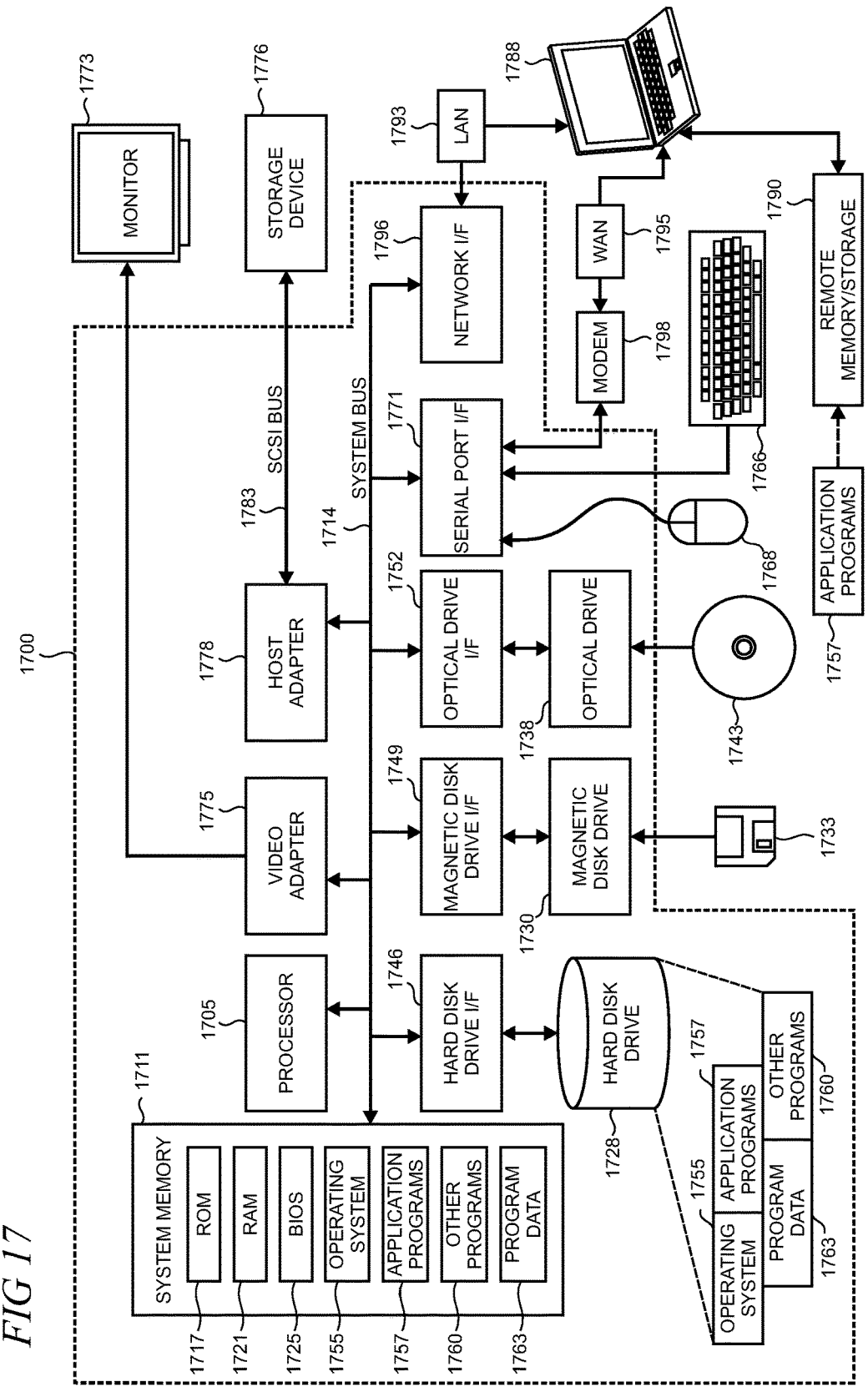
FIG. 17 is a simplified block diagram of an illustrative computer system such as a personal computer (PC) that may be used in part to implement the present app powered extensibility.

FIG. 17 is a simplified block diagram of an illustrative computer system 1700 such as a PC, client machine, or server with which the present app powered extensibility may be implemented. Computer system 1700 includes a processor 1705, a system memory 1711, and a system bus 1714 that couples various system components including the system memory 1711 to the processor 1705. The system bus 1714 may be any of several types of bus structures including a memory bus or memory controller, a peripheral bus, or a local bus using any of a variety of bus architectures. The system memory 1711 includes read only memory (ROM) 1717 and random access memory (RAM) 1721. A basic input/output system (BIOS) 1725, containing the basic routines that help to transfer information between elements within the computer system 1700, such as during startup, is stored in ROM 1717. The computer system 1700 may further include a hard disk drive 1728 for reading from and writing to an internally disposed hard disk (not shown), a magnetic disk drive 1730 for reading from or writing to a removable magnetic disk 1733 (e.g., a floppy disk), and an optical disk drive 1738 for reading from or writing to a removable optical disk 1743 such as a CD (compact disc), DVD (digital versatile disc), or other optical media. The hard disk drive 1728, magnetic disk drive 1730, and optical disk drive 1738 are connected to the system bus 1714 by a hard disk drive interface 1746, a magnetic disk drive interface 1749, and an optical drive interface 1752, respectively. The drives and their associated computer-readable storage media provide non-volatile storage of computer-readable instructions, data structures, program modules, and other data for the computer system 1700. Although this illustrative example includes a hard disk, a removable magnetic disk 1733, and a removable optical disk 1743, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present app powered extensibility. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1733, optical disk 1743, ROM 1717, or RAM 1721, including an operating system 1755, one or more application programs 1757, other program modules 1760, and program data 1763. A user may enter commands and information into the computer system 1700 through input devices such as a keyboard 1766 and pointing device 1768 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1705 through a serial port interface 1771 that is coupled to the system bus 1714, but may be connected by other interfaces, such as a parallel port, game port, or universal serial bus (USB). A monitor 1773 or other type of display device is also connected to the system bus 1714 via an interface, such as a video adapter 1775. In addition to the monitor 1773, personal computers typically include other peripheral output devices (not shown), such as speakers and printers. The illustrative example shown in FIG. 17 also includes a host adapter 1778, a Small Computer System Interface (SCSI) bus 1783, and an external storage device 1776 connected to the SCSI bus 1783.

The computer system 1700 is operable in a networked environment using logical connections to one or more remote computers, such as a remote computer 1788. The remote computer 1788 may be selected as another personal computer, a server, a router, a network PC, a peer device, or other common network node, and typically includes many or all of the elements described above relative to the computer system 1700, although only a single representative remote memory/storage device 1790 is shown in FIG. 17. The logical connections depicted in FIG. 17 include a local area network (LAN) 1793 and a wide area network (WAN) 1795. Such networking environments are often deployed, for example, in offices, enterprise-wide computer networks, intranets, and the Internet.

When used in a LAN networking environment, the computer system 1700 is connected to the local area network 1793 through a network interface or adapter 1796. When used in a WAN networking environment, the computer system 1700 typically includes a broadband modem 1798, network gateway, or other means for establishing communications over the wide area network 1795, such as the Internet. The broadband modem 1798, which may be internal or external, is connected to the system bus 1714 via a serial port interface 1771. In a networked environment, program modules related to the computer system 1700, or portions thereof, may be stored in the remote memory storage device 1790. It is noted that the network connections shown in FIG. 17 are illustrative and other means of establishing a communications link between the computers may be used depending on the specific requirements of an application of the present app powered extensibility.

Figure 18:
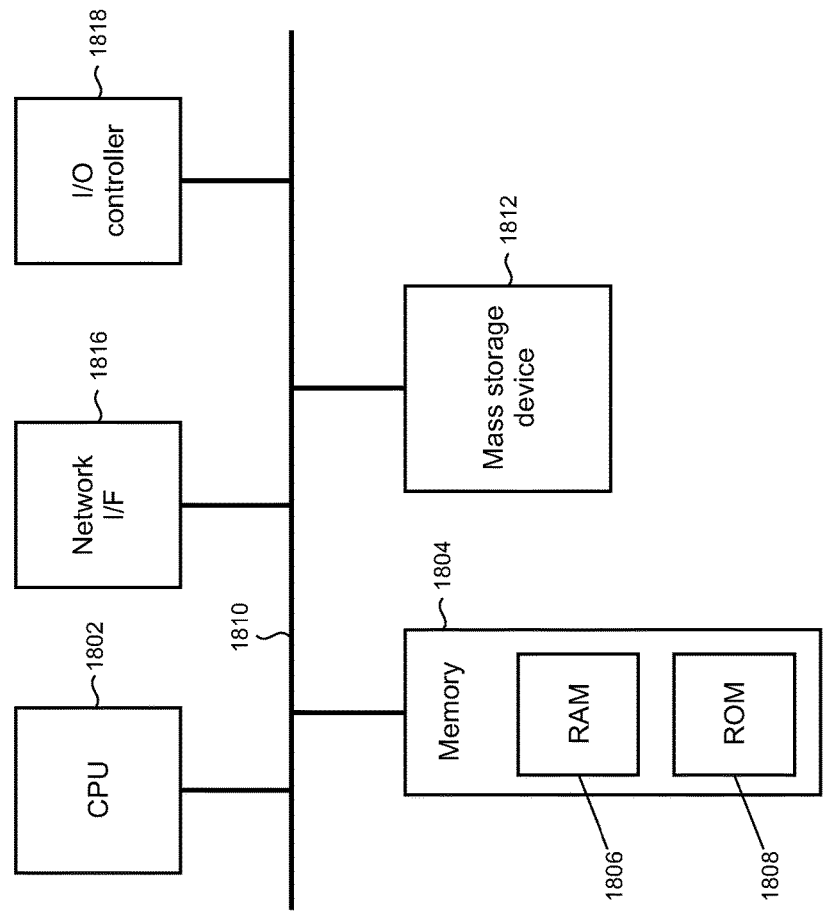
FIG. 18 shows a block diagram of an illustrative device that may be used in part to implement the present app powered extensibility.

FIG. 18 shows an illustrative architecture 1800 for a device capable of executing the various components described herein for providing the present app powered extensibility. Thus, the architecture 1800 illustrated in FIG. 18 shows an architecture that may be adapted for a server computer, mobile phone, a PDA, a smartphone, a desktop computer, a netbook computer, a tablet computer, GPS device, gaming console, and/or a laptop computer. The architecture 1800 may be utilized to execute any aspect of the components presented herein.

The architecture 1800 illustrated in FIG. 18 includes a CPU (Central Processing Unit) 1802, a system memory 1804, including a RAM 1806 and a ROM 1808, and a system bus 1810 that couples the memory 1804 to the CPU 1802. A basic input/output system containing the basic routines that help to transfer information between elements within the architecture 1800, such as during startup, is stored in the ROM 1808. The architecture 1800 further includes a mass storage device 1812 for storing software code or other computer-executed code that is utilized to implement applications, the file system, and the operating system.

The mass storage device 1812 is connected to the CPU 1802 through a mass storage controller (not shown) connected to the bus 1810. The mass storage device 1812 and its associated computer-readable storage media provide non-volatile storage for the architecture 1800.

Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, or electronic stylus (not shown in FIG. 18). Similarly, the input/output controller 1818 may provide output to a display screen, a printer, or other type of output device (also not shown in FIG. 18).

It may be appreciated that the software components described herein may, when loaded into the CPU 1802 and executed, transform the CPU 1802 and the overall architecture 1800 from a general-purpose computing system into a special-purpose computing system customized to facilitate the functionality presented herein. The CPU 1802 may be constructed from any number of transistors or other discrete circuit elements, which may individually or collectively assume any number of states. More specifically, the CPU 1802 may operate as a finite-state machine, in response to executable instructions contained within the software modules disclosed herein. These computer-executable instructions may transform the CPU 1802 by specifying how the CPU 1802 transitions between states, thereby transforming the transistors or other discrete hardware elements constituting the CPU 1802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It may also be appreciated that the architecture 1800 may include other types of computing devices, including handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Figure 19:
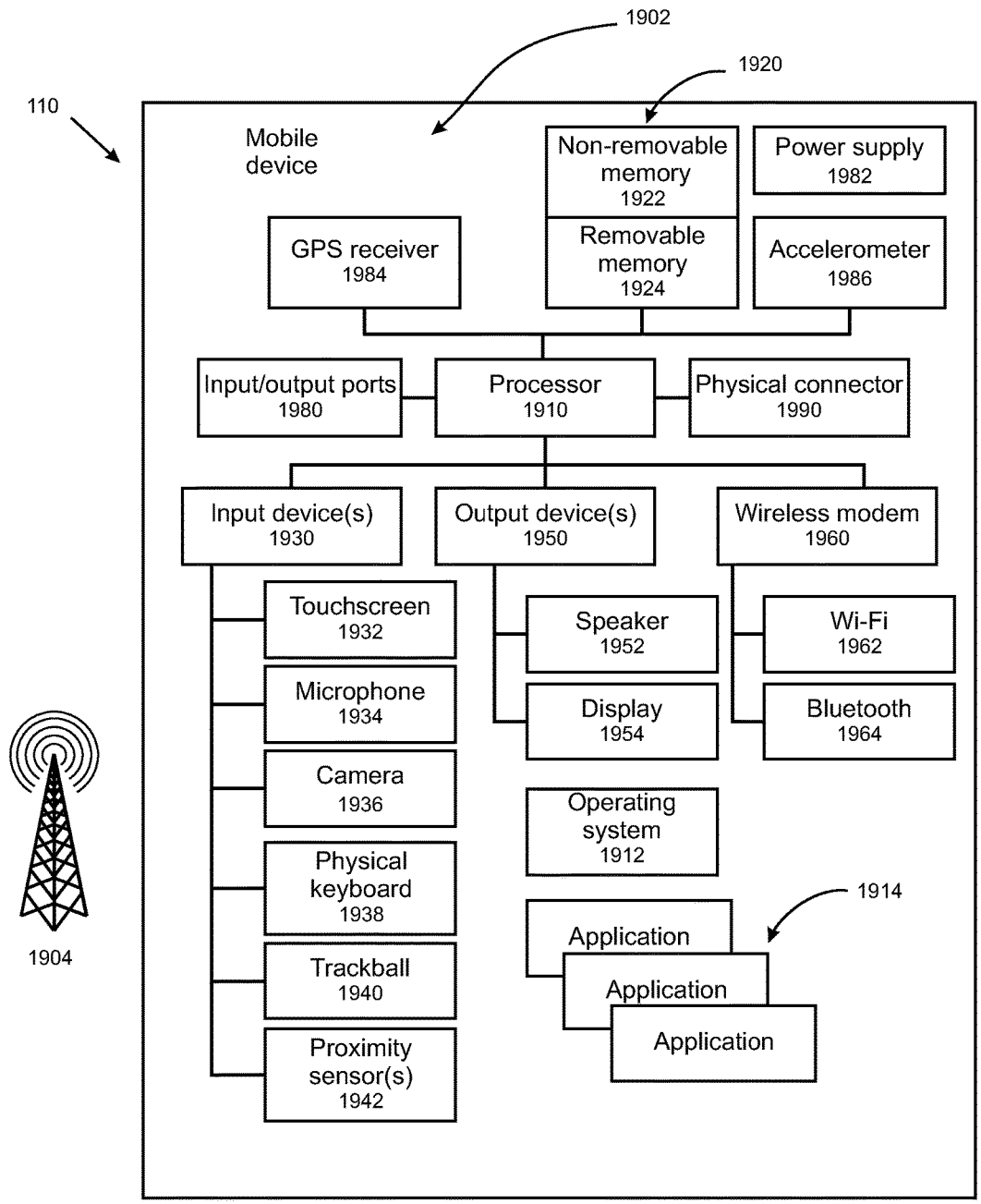
FIG. 19 is a block diagram of an illustrative mobile device.

FIG. 19 is a functional block diagram of an illustrative mobile device 110 such as a mobile phone or smartphone including a variety of optional hardware and software components, shown generally at 1902. Any component 1902 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1904, such as a cellular or satellite network.

The illustrated device 110 can include a controller or processor 1910 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1912 can control the allocation and usage of the components 1902, including power states, above-lock states, and below-lock states, and provides support for one or more application programs 1914. The application programs can include common mobile computing applications (e.g., image-capture applications, email applications, calendars, contact managers, web browsers, messaging applications), or any other computing application.

The illustrated mobile device 110 can include memory 1920. Memory 1920 can include non-removable memory 1922 and/or removable memory 1924. The non-removable memory 1922 can include RAM, ROM, Flash memory, a hard disk, or other well-known memory storage technologies. The removable memory 1924 can include Flash memory or a Subscriber Identity Module (SIM) card, which is well known in GSM (Global System for Mobile communications) systems, or other well-known memory storage technologies, such as "smart cards." The memory 1920 can be used for storing data and/or code for running the operating system 1912 and the application programs 1914. Example data can include web pages, text, images, sound files, video data, or other data sets to be sent to and/or received from one or more network servers or other devices via one or more wired or wireless networks.

The memory 1920 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 1920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 1930; such as a touch screen 1932; microphone 1934 for implementation of voice input for voice recognition, voice commands and the like; camera 1936; physical keyboard 1938; trackball 1940; and/or proximity sensor 1942; and one or more output devices 1950, such as a speaker 1952 and one or more displays 1954. Other input devices (not shown) using gesture recognition may also be utilized in some cases. Other possible output devices (not shown) can include piezoelectric or haptic output devices. Some devices can serve more than one input/output function. For example, touchscreen 1932 and display 1954 can be combined into a single input/output device.

A wireless modem 1960 can be coupled to an antenna (not shown) and can support two-way communications between the processor 1910 and external devices, as is well understood in the art. The modem 1960 is shown generically and can include a cellular modem for communicating with the mobile communication network 1904 and/or other radio-based modems (e.g., Bluetooth 1964 or Wi-Fi 1962). The wireless modem 1960 is typically configured for communication with one or more cellular networks, such as a GSM network for data and voice communications within a single cellular network, between cellular networks, or between the mobile device and a public switched telephone network (PSTN).

The mobile device can further include at least one input/output port 1980, a power supply 1982, a satellite navigation system receiver 1984, such as a GPS receiver, an accelerometer 1986, a gyroscope (not shown), and/or a physical connector 1990, which can be a USB port, IEEE 1394 (FireWire) port, and/or an RS-232 port. The illustrated components 1902 are not required or all-inclusive, as any components can be deleted and other components can be added.

Figure 20:
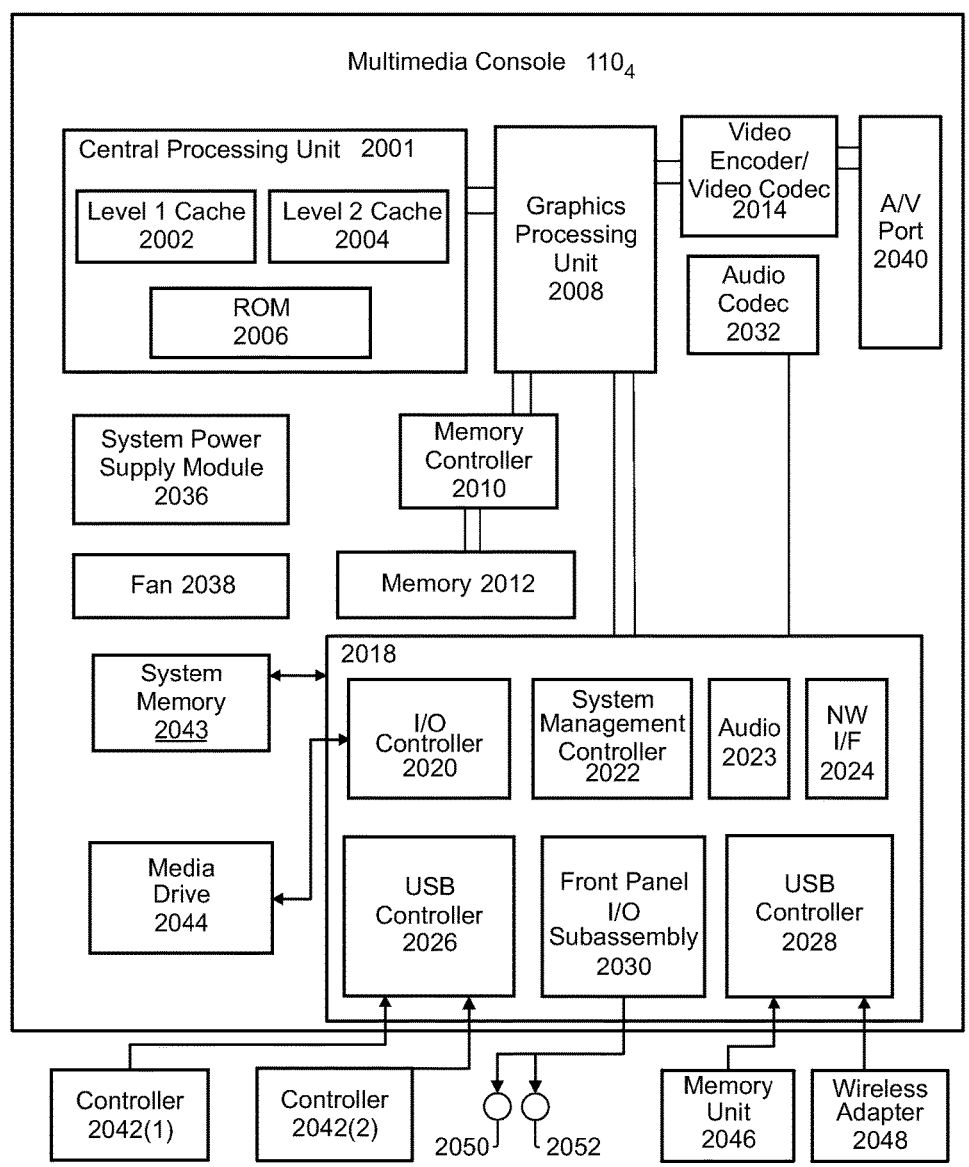
FIG. 20 is a block diagram of an illustrative multimedia console.

FIG. 20 is an illustrative functional block diagram of a multimedia console $110_4$. The multimedia console $110_4$ has a central processing unit (CPU) 2001 having a level 1 cache 2002, a level 2 cache 2004, and a Flash ROM (Read Only Memory) 2006. The level 1 cache 2002 and the level 2 cache 2004 temporarily store data and hence reduce the number of memory access cycles, thereby improving processing speed and throughput. The CPU 2001 may be configured with more than one core, and thus, additional level 1 and level 2 caches 2002 and 2004. The Flash ROM 2006 may store executable code that is loaded during an initial phase of a boot process when the multimedia console $110_4$ is powered ON.

A graphics processing unit (GPU) 2008 and a video encoder/video codec (coder/decoder) 2014 form a video processing pipeline for high speed and high resolution graphics processing. Data is carried from the GPU 2008 to the video encoder/video codec 2014 via a bus. The video processing pipeline outputs data to an A/V (audio/video) port 2040 for transmission to a television or other display. A memory controller 2010 is connected to the GPU 2008 to facilitate processor access to various types of memory 2012, such as, but not limited to, a RAM.

The multimedia console $110_4$ includes an I/O controller 2020, a system management controller 2022, an audio processing unit 2023, a network interface controller 2024, a first USB (Universal Serial Bus) host controller 2026, a second USB controller 2028, and a front panel I/O subassembly 2030 that are preferably implemented on a module 2018. The USB controllers 2026 and 2028 serve as hosts for peripheral controllers 2042(1) and 2042(2), a wireless adapter 2048, and an external memory device 2046 (e.g., Flash memory, external CD/DVD ROM drive, removable media, etc.). The network interface controller 2024 and/or wireless adapter 2048 provide access to a network (e.g., the Internet, home network, etc.) and may be any of a wide variety of various wired or wireless adapter components including an Ethernet card, a modem, a Bluetooth module, a cable modem, or the like.

System memory 2043 is provided to store application data that is loaded during the boot process. A media drive 2044 is provided and may comprise a DVD/CD drive, hard drive, or other removable media drive, etc. The media drive 2044 may be internal or external to the multimedia console $110_4$. Application data may be accessed via the media drive 2044 for execution, playback, etc. by the multimedia console $110_4$. The media drive 2044 is connected to the I/O controller 2020 via a bus, such as a Serial ATA bus or other high speed connection (e.g., IEEE 1394).

The system management controller 2022 provides a variety of service functions related to assuring availability of the multimedia console $110_4$. The audio processing unit 2023 and an audio codec 2032 form a corresponding audio processing pipeline with high fidelity and stereo processing. Audio data is carried between the audio processing unit 2023 and the audio codec 2032 via a communication link. The audio processing pipeline outputs data to the A/V port 2040 for reproduction by an external audio player or device having audio capabilities.

The front panel I/O subassembly 2030 supports the functionality of the power button 2050 and the eject button 2052, as well as any LEDs (light emitting diodes) or other indicators exposed on the outer surface of the multimedia console $110_4$. A system power supply module 2036 provides power to the components of the multimedia console $110_4$. A fan 2038 cools the circuitry within the multimedia console $110_4$.

The CPU 2001, GPU 2008, memory controller 2010, and various other components within the multimedia console $110_4$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 2043 into memory 2012 and/or caches 2002 and 2004 and executed on the CPU 2001. The application may present a graphical user interface that provides a consistent user experience when navigating to different media types available on the multimedia console 110₄. In operation, applications and/or other media contained within the media drive 2044 may be launched or played from the media drive 2044 to provide additional functionalities to the multimedia console 110₄.

The multimedia console 110₄ may be operated as a standalone system by simply connecting the system to a television or other display. In this standalone mode, the multimedia console 110₄ allows one or more users to interact with the system, watch movies, or listen to music. However, with the integration of broadband connectivity made available through the network interface controller 2024 or the wireless adapter 2048, the multimedia console 110₄ may further be operated as a participant in a larger network community.

When the multimedia console 110₄ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 110₄ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2001 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2042(1) and 2042(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Based on the foregoing, it may be appreciated that technologies for app powered extensibility have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present app powered extensibility, which is set forth in the following claims.

What is claimed:

1. One or more computer-readable memories storing instructions which, when executed by one or more processors disposed in a local device having communications capabilities over a network, cause the local device to:
   provide a user interface that exposes a plurality of composer applications for selection by a user of the local device, each composer application enabling a different user experience to be provided to a user of a remote device when selected, wherein each one of the plurality of composer applications is selectable within an instant messaging platform and includes a user interface that is unique to the respective composer application;
   operate a selected composer application on the local device;
   generate content by the selected composer application to support a user experience at the remote device;
   package the content into a file having a format that is compatible with the instant messaging platform, the instant messaging platform providing transparent packaged content transport for the selected composer application as an underlying service;
   receive, at the local device, the packaged content from the selected composer application; and
   provide a link to the remote device to download a composer application that corresponds to the selected composer application or provide a link to the remote device to access a web application that supports the user experience of the selected composer application.

2. The one or more computer-readable memories of claim 1 in which the user experience is one of an experience that is integrated with a messaging application experience or an experience that is supported on a standalone basis.

3. The one or more computer-readable memories of claim 1 in which the executed instructions further cause the local device to provide a preview of the packaged content to the instant messaging platform, in which the preview includes one of static object or animated object.

4. The one or more computer-readable memories of claim 1 in which the selected composer application supports a turn-by-turn experience between the user of the local device and the user of the remote device.

5. The one or more computer-readable memories of claim 4 in which the turn-by-turn experience is incorporated into a merged messaging history that is displayed on each of the local and remote devices.

6. The one or more computer-readable memories of claim 1 in which the instant messaging platform provides user authentication services to each of the plurality of composer applications.

7. The one or more computer-readable memories of claim 6 in which the user authentication services enable users to log on to the instant messaging platform without having to provide separate logons to each of the plurality of composer applications.

8. The one or more computer-readable memories of claim 1 further including configuring the selected composer application to be unplugged from the instant messaging platform in response to user input.

9. The one or more computer-readable memories of claim 1 further including unpacking content sent over the instant messaging platform from the corresponding composer application executing on the remote device.

10. The one or more computer-readable memories of claim 9 further including providing a user experience for the user of the local device using the unpacked content.

11. A system, comprising:
one or more processors;
a display that supports a user interface (UI) for interacting with a device user; and
a memory storing computer-readable instructions which, when executed by the one or more processors cause the one or more processors to
provide a plurality of composer applications on the UI for selection by the device user;
expose to the plurality of composer applications, through an application programming interface (API), methods for generating content, packing the content into a file for transport using an instant message platform to a remote device, and for providing a preview of the packaged content, the packaged content supporting an instant message user experience for rendering on the remote device, the instant message platform providing transparent packaged content transport for the plurality of composer applications as an underlying service,
receive packaged content and the content preview from a selected composer application through the API, in which the instant message platform identifies a corresponding composer application from the plurality of composer applications that is executable on the remote device to render the instant message user experience that is associated with the received packaged content,
provide a link to the remote device to download the corresponding composer application or provide a link to the remote device to access a web application that supports the instant message user experience of the selected composer application,
integrate the content preview into a portion of a messaging history associated with the instant message platform, wherein the content preview of the messaging history is from at least the one or more composer applications,
display the messaging history with the content preview on the UI, wherein the content preview includes multiple content previews that are respectively associated with multiple composer applications, and
configure the displayed content preview in the messaging history to function as a launching point for the composer application.

12. The system of claim 11, in which the executed computer-readable instructions further cause the one or more processors to pass the packaged content received from the remote device to the identified corresponding composer application or the web application.

13. The system of claim 11, in which the executed computer-readable instructions further cause the one or more processors to utilize the content preview received from the remote device in a merged messaging history.

14. The system of claim 11, in which the executed computer-readable instructions further cause the one or more processors to use the content preview received from the remote device as at least a portion of a user-selectable control for launching the identified corresponding composer application.

15. A method for operating an extensible messaging platform supporting a plurality of composer applications, the method comprising the steps of:
providing a user interface that exposes the plurality of composer applications for selection by a user;
receiving packaged content and a content preview from a local client executing on a local device, the content being generated, packaged, and the content preview being generated by a local composer application selected from the plurality of composer applications executing on the local device;
transporting the packaged content and content preview over an instant messaging platform, the transportation being performed transparently to the composer application; and
providing the transported packaged content and content preview to a remote client executing on a remote device, wherein the remote client:
identifies, using the instant messaging platform, a requirement for a remote composer application from the plurality of composer applications for execution on the remote device to render a user experience that is associated with the packaged content, in which content within the packaged content is used to identify the remote composer application; and
receives a link for the remote device to download the identified remote composer application to render the user experience that is associated with the packaged content or receives a link for the remote device to access a web client to render the user experience that is associated with the packaged content.

16. The method of claim 15 in which the local client and remote client each utilize the content preview in a messaging history that is shared between the local and remote devices.

17. The method of claim 15 in which the local and remote composer applications interface with respective local and remote clients using an application programming interface (API), the API exposing methods for packing and unpacking content.

18. The method of claim 15 further comprising authenticating a user at the extensible messaging platform on behalf of the local composer application or the remote composer application.

* * * * *